United States Patent
Bruggemann et al.

(10) Patent No.: US 6,584,689 B2
(45) Date of Patent: Jul. 1, 2003

(54) MULTI-SECTION SUPPORT RAIL APPARATUS AND METHOD OF MAKING

(75) Inventors: Charles J. Bruggemann, Rochester Hills, MI (US); Sanjay Mahasukhlal Shah, Troy, MI (US); Hesham Ahmed Ezzat, Troy, MI (US); Michael R Webb, White Lake, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/283,755

(22) Filed: Oct. 30, 2002

(65) Prior Publication Data

US 2003/0080590 A1 May 1, 2003

Related U.S. Application Data

(62) Division of application No. 10/066,321, filed on Oct. 26, 2001.
(51) Int. Cl.⁷ ................................................ B21D 53/88
(52) U.S. Cl. ....................... 29/897.2; 29/897; 29/897.3; 29/897.35; 29/421.1
(58) Field of Search ............................. 296/188, 189, 296/203.02, 203.04, 204, 194, 195, 205; 280/784, 785, 797, 798; 188/371; 52/735.1; 29/897, 897.2, 897.3, 897.312, 897.35, 421.1, 522.1, 428, DIG. 3, DIG. 47; 72/58, 61, 253.1, 264, 369

(56) References Cited

U.S. PATENT DOCUMENTS

| 4,759,111 | A | * | 7/1988 | Cudini ........................ 29/523 |
| 5,829,219 | A | * | 11/1998 | Sugawara et al. ......... 52/653.2 |
| 5,868,457 | A | * | 2/1999 | Kitagawa .................... 296/188 |
| 6,014,884 | A | * | 1/2000 | Bartholomew ............... 72/369 |
| 6,138,429 | A | * | 10/2000 | Baumgaertner ........... 52/735.1 |
| 6,357,822 | B1 | * | 3/2002 | Panoz et al. ................ 296/209 |
| 6,499,798 | B2 | * | 12/2002 | Takemoto ............. 296/203.02 |

\* cited by examiner

Primary Examiner—Gregory Vidovich
Assistant Examiner—T. Nguyen
(74) Attorney, Agent, or Firm—Laura C. Hargitt

(57) ABSTRACT

A multi-section support rail has a first section with an outer circumferential wall, a parallel inner circumferential wall and a transverse web extending longitudinally therealong, a second section hollow tubular section with an outer circumferential wall and a parallel inner circumferential wall. The outer circumferential walls are substantially identical dimensionally. The sections are joined at mating surfaces,. The joined sections are pre-bent at the second section and then hydroformed to a final desired shape. The transverse web retains the extruded dimensions throughout the hydroforming process.

3 Claims, 2 Drawing Sheets

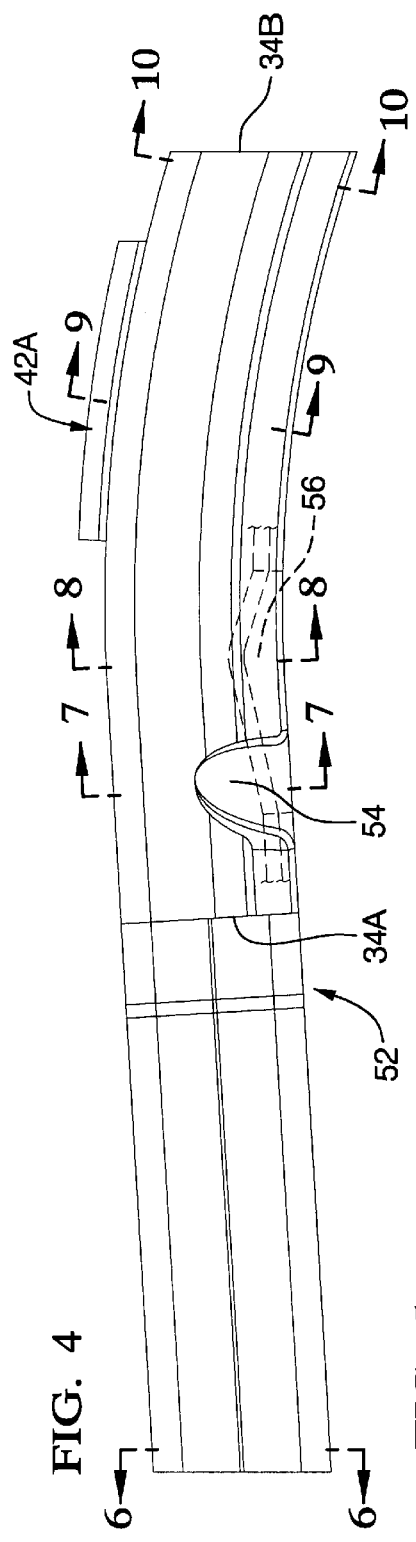

MULTI-SECTION SUPPORT RAIL APPARATUS AND METHOD OF MAKING

This is a division of application Ser. No. 10/066,321 filed on Oct. 26, 2001.

TECHNICAL FIELD

This invention relates to multi-section support rails and more particularly to multi-section support rails used in automotive vehicles.

BACKGROUND OF THE INVENTION

Multi-section support rails are used in many components of an automobile body structure and chassis frame. The underbody rails are often termed frame rails that generally have a front and rear portion. The front portion usually has two sections. One section is designed to provide crush energy management and the other section is crush resistance. The frame rails employed today are composed of two different cross-sectional configurations. The crush energy management section is larger in area with a thinner wall thickness. This section may have a plurality of dimples or indentations that encourage crush initiation at predetermined locations along the length of the section. The first section includes an end profile that will accept slight overlapping of the second section so that joining of the two sections is possible.

The second section is designed to be stiffer and is usually smaller than the first section for various vehicle package constraints. The second section includes an end profile that will fit within the end profile of the first section. Thus the current multi-section frame rails have some redundant material that is required for the overlapping which permits joining of the two sections. The sections are generally joined by bonding, welding and/or mechanical fasteners. The longitudinal configuration of the two sections is completed prior to the joining operation.

SUMMARY OF THE INVENTION

The present invention seeks to overcome the disadvantages of the prior art multi-section support rails. To this end it is an object of the present invention to provide an improved multi-section support rail structure configuration which may be applicable to all regions of a vehicle body structure.

In one aspect of the present invention, a multi-section support rail with two sections is provided. In another aspect of the present invention, a first of the sections is crush compliant and the second of the sections is crush resistant. In another aspect of the present invention, the two sections have substantially identical end mating cross-sectional outlines and wall thickness. In yet another aspect of the present invention, the two sections are in longitudinal alignment while being joined at the mating surface. In still another aspect of the present invention, the crush compliant section has a cross-sectional structure with a centrally disposed transverse web extending substantially for the entire length thereof.

In still another aspect of the present invention, the crush resistant section is pre-bent, after joining, to the desired longitudinal configuration. In yet still another aspect of the present invention, the joined sections are hydroformed to the final configuration. In a further aspect of the present invention, the crush resistant section has indentations formed along the length thereof during hydroforming to provide clearance with adjacent components during vehicle assembly. In a yet further aspect of the present invention, the sections are formed by separate extruding processes prior to joining. In a still further aspect of the present invention, the crush resistant section is extruded with a hollow cross-sectional structure with support flanges extending from the outer surface thereof.

BRIEF DESCRIPTION OF THE DRAWINGS

FIG. 4 is a top view of the multi-section support rail incorporating the present invention after pre-bending and hydroforming.

FIG. 5 is an elevational view of the multi-section support rail incorporating the present invention after pre-bending and hydroforming.

FIG. 6 is a view taken along line 6—6 in FIG. 5.

FIG. 7 is a view taken along line 7—7 in FIG. 5.

FIG. 8 is a view taken along line 8—8 in FIG. 5.

FIG. 9 is a view taken along line 9—9 in FIG. 5.

FIG. 10 is a view taken along line 10—10 in FIG. 5.

FIG. 11 is an alternative structure for one end of the multi-section support rail.

FIG. 12 is an end view of the alternative structure of FIG. 11.

DESCRIPTION OF AN EXEMPLARY EMBODIMENT

Figure 1:
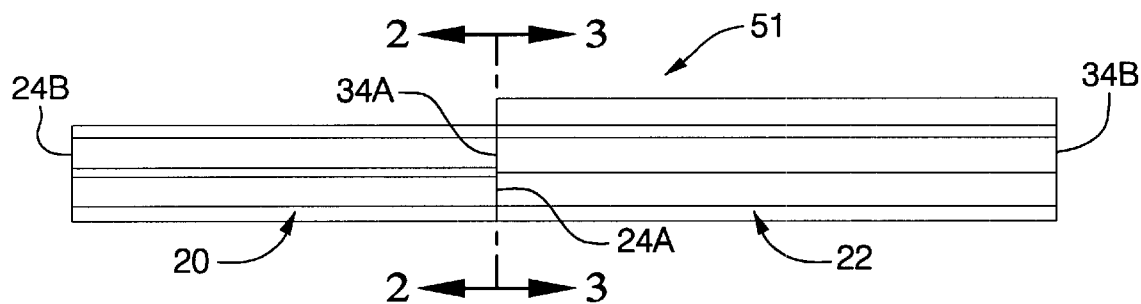
FIG. 1 is an elevational view of two extruded sections joined together.
Figure 2:
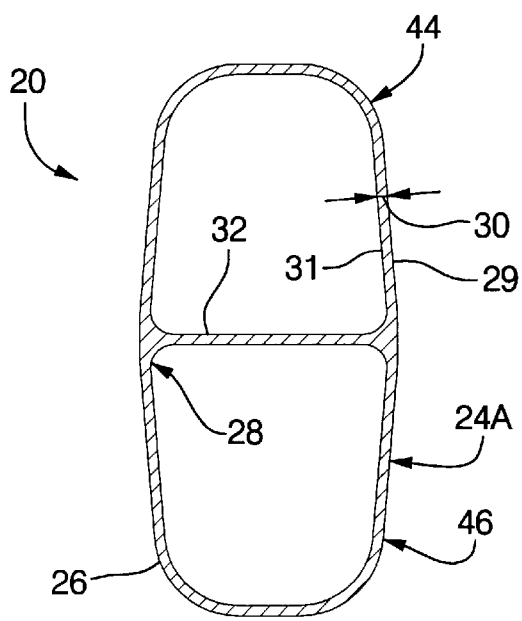
FIG. 2 is a view taken along line 2—2 in FIG. 1.

Referring to the drawings wherein like characters represent the same or corresponding parts throughout the several views there is seen in FIG. 1 a pair of extruded sections 20 and 22. The section 20 has an end surface 24A, FIG. 2, that defines a cross-sectional outline 26 and a cross-sectional structure 28. The outline 26 is defined by the outer circumferential wall of the end surface 24A. The structure 28 is defined by a wall thickness 30 (between the outer and inner circumferential walls 29, 31 respectively) and a transverse centrally located web 32.

Figure 3:
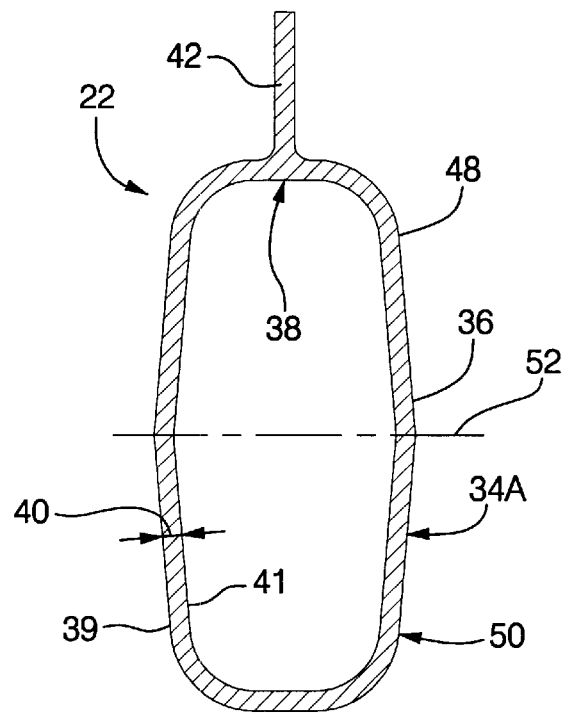
FIG. 3 is a view taken along line 3—3 in FIG. 1.

The section 22 has an end surface 34A, FIG. 3, that defines a cross-sectional outline 36 and a cross-sectional structure 38. The cross-sectional outline 36 is defined by the outer circumferential wall of the end surface 34A. The cross-sectional structure 38 is defined by a wall thickness 40 (between the outer and inner circumferential wall 39, 41 respectively) and a flange 42. The cross-sectional outline 36, by definition, does not include the flange 42. The cross-sectional outlines 26 and 36 have the same outside dimensions, however, the cross-sectional outline 36 may have a slightly greater wall thickness 40 than the wall thickness 30 of the cross-sectional outline 26. In one example, the wall thickness 40 is 5.00 mm while the wall thickness 30 is 3.00 mm and the thickness of the web 32 is 3.00 mm.

The cross-sectional structure 28 is shown as two substantially trapezoidal elements 44 and 46 with the web 32 as the base. The cross-sectional structure 38 is shown as two substantially trapezoidal elements 48 and 50 joined at a centerline 52 which represents the base. The outline 26 is substantially equal to or congruent with the outline 36 such that when the extruded sections 20 and 22 are placed in abutment, a continuous circumferential surface, except for the flange 42, is presented.

The web 32 extends the length of the section 20 from end 24A to end 24B. The flange 42 extends longitudinally along the section 22. While shown as extending from end 34A to end 34B, the flange can begin at a point spaced from either or both ends 34A, 34B. The section 20 is designed to provide crush compliance. The section 20 will collapse under the application of external forces in a controlled manned. The section 22 is designed to be crush resistant such that a much greater external force is required to cause the section 22 to undergo a significant change of shape.

As set forth above, the sections 20 and 22 are joined or bonded, by welding or other suitable process, to form a continuous single rail blank 51 as shown in FIG. 1. Following the joining, the section 22 of the rail blank 51 is pre-bent to a shape consistent with that shown in FIGS. 4 and 5. After the rail blank 51 is pre-bent to the desired shape, the rail blank 51 is then hydroformed to the finished shape of a rail 52, shown in FIGS. 4 through 10.

As best seen in FIG. 6, the cross-sectional structure 28 and the cross-sectional outline 26 are expanded to a more rectangular shape. During this expansion, the web 32 remains substantially the same length, width, and thickness. The cross-sectional structure 38 and cross-sectional outline 36 of the section 22 undergo changes from end 34A to end 34B. As seen in FIGS. 9 and 10, the final shape is essentially rectangular.

As seen in FIGS. 7 and 8, the cross-sectional structure 38 has been changed to include indentations 54 and 56. These changes in shape provide clearance for other components of the vehicle frame. The flange 42 is trimmed to a specific location 42A as shown in FIGS. 4, 5, and 9.

While the flange 42 could be attached after the final shape is achieved, it is considered to be better practice to extrude the flange with the section 22 and then trim the excess material. This permits the flange 42 to be positioned where needed for each environment without the need for additional bonding or joining processes which would require additional fixturing for each specific application.

An alternate embodiment of the section 22 is shown in FIGS. 11 and 12. The section 22A has an end portion 58, with outer and inner circumferential walls 59, 61 respectively, expanded outwardly to establish a receptacle portion 60 that is adapted to receive additional components for the multi-section support rail structure 51. The expansion of the end portion 58 can occur before, after, or during the hydroforming process.

The multi-section support rail 52 is manufactured with the following steps:

1. Extruding a first length with substantially parallel outer most and inner most circumferential walls, a central transverse web, and an end mating surface;
2. Extruding a second tubular length with substantially parallel outer most and inner most circumferential walls, a flange portion extending outward from the outer most circumferential wall, and an end mating surface, the outer most circumferential wall being congruent with the outer most circumferential wall of said first length;
3. Joining said first and second lengths at the respective end mating surfaces;
4. Pre-bending the second length at a location longitudinally spaced from the joined mating surfaces to an approximate final shape;
5. Hydroforming the approximate final shape to a final shape.

Following or proceeding the hydroforming step, the flange may be trimmed to a specific location on the outer perimeter of the outer most circumferential wall of the second section.

What is claimed is:

1. A method of manufacturing a multi-section support rail apparatus comprising the steps of:
   a. extruding a first tubular length with substantially parallel outer most and inner most circumferential walls, a central transverse web, and an end mating surface;
   b. extruding a second tubular length with substantially parallel outer most and inner most circumferential walls, a flange portion extending outward from the outer most circumferential wall, and an end mating surface, the outer most circumferential wall being congruent with the outer most circumferential wall of said first tubular length;
   c. joining said first and second lengths at the respective end mating surfaces;
   d. pre-bending, as required, the joined tubular lengths at predetermined locations longitudinally spaced from the joined mating surfaces to an approximate final shape;
   e. hydroforming the approximate final shape to a final shape.

2. The method of manufacturing a multi-section support rail apparatus defined in claim 1 further comprising the step of:
   f. trimming said flange to a specific location longitudinally displaced from the joined mating surfaces.

3. The method of manufacturing a multi-section support rail apparatus defined in claim 1 further comprising the step of:
   g. retaining the thickness and length of the central transverse web during the hydroforming process.

* * * * *